United States Patent Office 3,338,950
Patented Aug. 29, 1967

3,338,950
IODOPROPARGYL ARALKYL ETHER
COMPOUNDS
Shigeo Seki, Fumio Kai, and Hiroshi Ogawa, Tokyo,
Japan, assignors to Meiji Seika Kaisha, Ltd., Tokyo,
Japan, a corporation of Japan
No Drawing. Filed July 7, 1964, Ser. No. 380,913
Claims priority, application Japan, July 23, 1963,
38/37,205
7 Claims. (Cl. 260—465)

This invention relates to new iodopropargyl aralkyl ether compounds and to processes for the production of the same compounds as well as to compositions containing the same compounds.

The new compounds, iodopropargyl aralkyl ethers, according to the present invention may be represented by the following general formula:

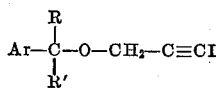

wherein Ar stands for a phenyl group which may bear on the aromatic nucleus up to two of the substituents selected from the group consisting of halogen, lower alkyl, lower alkoxy, carboxyl, cyano and nitro radicals, and R is selected from the group consisting of hydrogen, lower alkyl and phenyl radicals and R' is selected from the group consisting of hydrogen and phenyl radical. These new compounds iodopropargyl aralkyl ethers according to this invention have not been reported in any publication, but we have found that these new iodopropargyl aralkyl ethers may be produced and show useful anti-microbial activity.

We have already discovered that a certain group of halopropargyl aryl ethers shows not only an activity inhibitory to the growth of eumycetes but also high anti-microbial activity against various pathogenic bacteria such as *Streptococcus*, *Staphylococcus* and *Bacilus substilus* and that these compounds are particularly useful for the control or treatment of water-eczema since they have the advantages of the absence of irritation of human being's skin and of very much lower toxicity when taken orally.

We have made further researches on the production and anti-microbial activity of halopropargyl ether compounds, and as result we have now found that the above defined iodopropargyl aralkyl ether compounds show highly anti-microbial activity not only against eumycetes but also against other pathogenic bacteria.

This invention also includes a process for the production of the new iodopropargyl aralkyl ether compounds which comprises reacting a proper iodination agent in a proper manner with the corresponding propargyl aralkyl ether compound of the general formula:

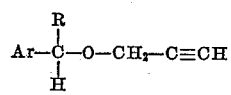

wherein Ar, R have the same significances as aforesaid.

The propargyl aralkyl ether compound used as the starting material for the process of the present invention may be readily prepared either by reacting an unsubstituted or correspondingly substituted benzyl alcohol derivative with propargyl bromide in the presence of an alkali metal hydroxide, or by reacting an unsubstituted or correspondingly substituted benzyl halide derivative with propargyl alcohol in the presence of an alkali metal hydroxide.

As the iodination methods which may be employed in the process of the invention, there are mentioned many of the conventional methods of halogenation by which it is possible to convert an acetylene compound into the corresponding acetylene halide. For instance, there may be applied the method of Adolf Baeyer according to which an acetylene compound is added to an aqueous suspension of cuprous hydroxide and the resulting cuprous acetylide is reacted with a halogen to give the acetylene halide compound (refer to Ber. 18, 2284 (1855)); the method of Straus F. et al. according to which an acetylene compound is reacted with a salt of hypo-halogenous acid to give the acetylene halide compound (refer to Ber. 63, 1868 (1930)); and the method of J.U. Nef according to which an acetylene compound is reacted with a halogen and the resulting dihalogen compound is reacted with an alkali metal to give the acetylene halide compound (refer to Ann. 308, 326 (1899)). For the process of the present invention, it is preferable to employ such a halogenation method in which an acetylene compound is dissolved in an aqueous alcohol such as methanol, ethanol and propanol and then reacted with iodine in the presence of an alkali metal hydroxide.

Among the particularly useful products which may be produced by the process of the invention, there may be mentioned, for example, iodopropargyl o-chlorobenzyl ether, iodopropargyl p-chlorobenzyl ether, iodopropargyl 3,4-dichlorobenzyl ether, iodopropargyl p-methoxybenzyl ether, iodopropargyl benzhydryl ether and iodopropargyl alpha-methylbenzyl ether.

In order to demonstrate the anti-microbial activity of the iodopropargyl aralkyl ether compounds of the invention, the minimum concentration of some compounds inhibitory to the growth of various micro-organisms are determined by the serial dilution method. The results obtained are shown in Table 1 below. The minimum inhibitory concentration is given in gamma per ml. For comparison, the results obtained with some of the corresponding propargylaralkyl ether compounds are shown together in Table 1.

TABLE 1

| Test Organisms | Structure of Compound | | | |
|---|---|---|---|---|
| | 4-Cl-C6H4-O-CH2-C≡CH | 4-Cl-C6H4-O-CH2-C≡CI | 2-Cl-C6H4-O-CH2-C≡CH | 2-Cl-C6H4-O-CH2-C≡CI |
| Trichophyton asteroides | 100 | 0.78 | 100 | 1> |
| Trichophyton interdigitale | | | | |
| Trichophyton rubrum | | | | |
| Staphylococcus aureus 209-P | >100 | 1-10 | | 1-10 |
| Streptococcus haemolyticus Cook | 100 | 1-10 | | 1-10 |
| Diplococcus pneumoniae Type-I | 10-50 | 1> | | 1> |
| Salmonella typhi O-901-W | >100 | 10-50 | | 10-50 |
| Bacillus subtilis PCI 219 | >100 | 1-10 | | 1-10 |
| Escherichia coli communis | | | | |
| Mycobacterium tuberculosis H37-RV | 10-50 | 1> | | 1> |
| Aspergillus fumigatus Saito | >100 | 0.78 | >100 | 1> |
| Candida albicans | >100 | 0.78 | >100 | 1> |
| Piricularia oryzae | | 1.25 | | 2.5 |
| Toxicity LD50, oral (mouse) | | >1,000 | | >1,000 |

| Test Organisms | Structure of Compound | | | |
|---|---|---|---|---|
| | 4-CH3O-C6H4-O-CH2-C≡CH | 4-CH3O-C6H4-O-CH2-C≡CI | 3,4-Cl2-C6H3-O-CH2-C≡CH | 3,4-Cl2-C6H3-O-CH2-C≡CI |
| Trichophyton asteroides | >100 | 1> | 50 | 1> |
| Trichophyton interdigitale | | | | |
| Trichophyton rubrum | | | | |
| Staphylococcus aureus 209-P | | 1-10 | | 1-10 |
| Streptococcus haemolyticus Cook | | 1-10 | | |
| Diplococcus pneumoniae Type-I | | 1> | | 1-10 |
| Salmonella typhi O-901-W | | 100 | | 100 |
| Bacillus subtilis PCI 219 | | 1-10 | | 1-10 |
| Escherichia coli communis | | | | 1-10 |
| Mycobacterium tuberculosis H37-RV | | 1> | | |
| Aspergillus fumigatus Saito | >100 | 1> | >100 | 1> |
| Candida albicans | >100 | 1> | >100 | 1> |
| Piricularia oryzae | | 5 | | 1.25 |
| Toxicity LD50, oral (mouse) | | | | >2,000 |

TABLE 1—Continued

| Test Organisms | Structure of Compound | | | |
|---|---|---|---|---|
| | p-CH₃-C₆H₄-, HC≡CCH₂OCH₂- | p-CH₃-C₆H₄-, IC≡CCH₂OCH₂- | m-CH₃-C₆H₄-, HC≡CCH₂OCH₂- | m-CH₃-C₆H₄-, IC≡CCH₂OCH₂- |
| Trichophyton asteroides | >100 | 1> | >100 | 1> |
| Trichophyton interdigitale | | 1–10 | | 1–10 |
| Trichophyton rubrum | | 1> | | 1> |
| Staphylococcus aureus 209-P | | 10–50 | | 10–50 |
| Streptococcus haemolyticus Cook | | 10–50 | | 10–50 |
| Diplococcus pneumoniae Type-I | | 10–50 | | 1–10 |
| Salmonella typhi O-901-W | | 10–50 | | 10–50 |
| Bacillus subtilis PCI 219 | | 10–50 | | 1–10 |
| Escherichia coli communis | | | | |
| Mycobacterium tuberculosis H37-RV | | 6.25 | | 12.5 |
| Aspergillus fumigatus Saito | >100 | 1–10 | >100 | 1–10 |
| Candida albicans | >100 | 1> | >100 | 1> |
| Piricularia oryzae | | 1.25 | | 1.25 |
| Toxicity LD50, oral (mouse) | | >1,000 | | >1,000 |

| Test Organisms | Structure of Compound | | | |
|---|---|---|---|---|
| | C₆H₅-, HC≡CCH₂OCH₂- | C₆H₅-, IC≡CCH₂OCH₂- | p-NO₂-C₆H₄-, HC≡CCH₂OCH₂- | p-NO₂-C₆H₄-, IC≡CCH₂OCH₂- |
| Trichophyton asteroides | >100 | 0.78 | 50 | 0.39 |
| Trichophyton interdigitale | | | | 1> |
| Trichophyton rubrum | | | | 1> |
| Staphylococcus aureus 209-P | | | | 10–50 |
| Streptococcus haemolyticus Cook | | | | 10–50 |
| Diplococcus pneumoniae Type-I | | | | 10–50 |
| Salmonella typhi O-901-W | | | | >100 |
| Bacillus subtilis PCI 219 | | | | 10–50 |
| Escherichia coli communis | | | | |
| Mycobacterium tuberculosis H37-RV | | | | 6.25 |
| Aspergillus fumigatus Saito | >100 | 0.78 | >100 | 0.78 |
| Candida albicans | >100 | 1.56 | >100 | 0.39 |
| Piricularia oryzae | | 2.5 | | 2.5 |
| Toxicity LD50, oral (mouse) | | | | |

TABLE 1—Continued

| Test Organisms | IC≡CCH₂O-C(CH₃)H-C₆H₅ | IC≡CCH₂OCH₂-C₆H₅ | IC≡CCH₂OCH₂-C₆H₄-COOH | IC≡CCH₂OCH₂-C₆H₄-CN |
|---|---|---|---|---|
| Trichophyton asteroides | 1-10 | 1-10 | 1-10 | 1> |
| Trichophyton interdigitale | | | | |
| Trichophyton rubrum | | | | |
| Staphylococcus aureus 209-P | 1-10 | 1-10 | >100 | |
| Streptococcus haemolyticus Cook | | | >100 | |
| Diplococcus pneumoniae Type-I | 1-10 | 1-10 | >100 | |
| Salmonella typhi O-901-W | >100 | >100 | >100 | |
| Bacillus subtilis PCI 219 | 1-10 | 1-10 | >100 | |
| Escherichia coli communis | | | | |
| Mycobacterium tuberculosis H37-RV | 1-10 | 10-50 | | |
| Aspergillus fumigatus Saito | 1-10 | 10-50 | 50 | 1> |
| Candida albicans | 1-10 | 1-10 | | 1> |
| Piricularia oryzae | 1.25 | 1.25 | 10 | |
| Toxicity LD50, oral (mouse) | >2,000 | | | |

As will be clear from the above table, the iodopropargyl aralkyl ether compounds of the invention apparently show lower toxicity and highly fungicidal activity against fungi such as *Trichophytons, Aspergillus fumigatus, Candida albicans* and *Piricularia oryzae*. According to a further aspect of the invention, therefore, there is provided a composition of external application for the control and treatment of water-eczema, which contains as the active ingredient at least one of the iodopropargyl aralkyl ether compounds of the invention and a suitable carrier for the active ingredient. The carrier which may be used in this composition includes a proper solvent for the active compound and liquid or solid diluents which are commonly employed in formulation of externally applied medicines.

According to another aspect of the invention, there is also provided a medicinal composition for the control and treatment of diseases in human being and animals occurring from the parasitism of fungi *Aspergillus fumigatus* and *Candida albicans*, which contains as the active ingredient at least one of the iodopropargyl aralkyl ether compounds of the invention and a suitable carrier for the active ingredient.

According to a further aspect of the invention, there is provided a fungicidal composition of agricultural and industrial applications which contains as the active ingredient at least one of the iodopropargyl aralkyl ether compounds of the invention and a suitable carrier for the active compound. This fungicidal composition is particularly effective in controlling rice plant-diseases which result from the parasitism of *Piricularia oryzae*.

The process of the invention is now illustrated with reference to the following examples which are non-limitative to the scope of the invention.

Example 1

A solution of 4.8 grams of potassium hydroxide in 5 cc. of water is added to 50 cc. of methanol, and 5 grams of propargyl o-chloro-benzyl ether of a boiling point of 68–72° C./1.3 mm. Hg are added thereto. 7.2 grams of iodine are added in small portions to the resulting liquid mixture under stirring while being cooled by ice-water. The addition of iodine is completed in about 30 minutes. The mixture is further stirred for 3 hours at room temperature and a large proportion of the methanol is thereafter distilled off under reduced pressure. The residue is added with 30 cc. of water and extracted by 100 cc. of ether. The ethereal extract is then washed with water and dried over anhydrous sodium sulfate. The ether is distilled off and the oily residue is fractionated under reduced pressure. There are obtained about 4.1 grams of iodopropargyl o-chlorobenzyl ether of a boiling point of 139–141° C./0.38 mm. Hg.

Example 2

A solution of 4.65 grams of potassium hydroxide in 5 cc. of water is added to 50 cc. of methanol, and then 5 grams of propargyl p-chlorobenzyl ether of a boiling point of 78–83° C./3 mm. Hg are added thereto. 7.05 grams of iodine are added to the resulting mixture in small portions under stirring while being cooled by ice-water. The subsequent treatment is carried out in a similar way to Example 1 and gives about 5.0 grams of iodopropargyl p-chlorobenzyl ether of a boiling point of 142–145° C./0.8 mm. Hg.

Example 3

A solution of 7.8 grams of potassium hydroxide in 10 cc. of water is added to 100 cc. of methanol, and 10 grams of propargyl 3,4-dichlorobenzyl ether of a boiling point of 95–100° C./0.25 mm. Hg are then added thereto. 14.75 grams of iodine are added to the mixture in the same manner as in Example 1. The subsequent treatment is carried out in a similar way to Example 1 and gives about 11.2 grams of iodopropargyl 3,4-dichlorobenzyl ether a boiling point of 150–155° C./0.23 mm. Hg.

Example 4

A mixture of 10 grams of propargyl p-methoxybenzyl ether of a boiling point of 93–96° C./0.26 mm. Hg and 9.55 grams of potassium hydroxide in 10 cc. of water and 100 cc. of methanol is reacted with 14.5 grams of iodine in the same manner as in Example 1. After the addition of iodine has been completed, the reaction mixture is further agitated for three hours at room temperature and then distilled under reduced pressure to remove a large proportion of the methanol. The residue is added with 60 cc. of water and then extracted with ether. The ethereal extract is dried over anhydrous sodium sulfate and distilled to remove the ether. The residue solidifies. Recrystallisation from cyclohexane gives about 13 grams of iodopropargyl p-methoxybenzyl ether of a melting point of 61–62° C.

Example 5

The procedure of Example 1 is repeated using 5.0 grams of propargyl benzhydryl ether of a boiling point of 138–142° C./0.04 mm. Hg, 1.8 grams of sodium hydroxide, 5 cc. of water, 50 cc. of methanol and 5.7 grams of iodine. About 5.5 grams of iodopropargyl benzhydryl ether of a boiling point of 162–165° C./0.02 mm. Hg are yielded.

Example 6

10 grams of propargyl alpha-methylbenzyl ether of a boiling point of 68–69° C./0.28 mm. Hg are added to a mixture of 10.5 grams of potassium hydroxide, 5 cc. of water and 50 cc. of methanol. 15.9 grams of iodine are added to the resulting admixture in small portions under stirring while being cooled by ice and water. After the addition of the whole amount of iodine has been completed, the mixture is further stirred for 2 hours at room temperature. The subsequent treatment in a similar way to Example 1 gives about 11 grams of iodopropargyl alpha-methylbenzyl ether of a boiling point of 80–85° C./0.07 mm. Hg.

Example 7

30 grams of propargyl ortho-methylbenzyl ether are added to a mixture of 31.5 grams of potassium hydroxide, 19 cc. of water and 190 cc. of methanol. 50 grams of iodine are then added to the resulting admixture in small portions under stirring while being cooled by ice and water. After the addition of iodine has been completed, the mixture is further stirred for 1 hour at 0° C. The subsequent treatment in a similar way to Example 1 gives about 34 grams of iodopropargyl ortho-methylbenzyl ether of a boiling point of 115–118° C./0.05 mm. Hg.

Example 8

The procedure of Example 7 is repeated using 30 grams of propargyl meta-methylbenzyl ether. 34 grams of iodopropargyl meta-methylbenzyl ether are obtained, which has a boiling point of 117–120° C./0.022 mm. Hg.

Example 9

19.6 grams of propargyl p-carboxybenzyl ether are dissolved in 100 cc. of an aqueous solution of 20% of sodium hydroxide. 50 grams of iodine are added slowly to the resulting mixture under stirring and cooling with ice. After the addition of iodine has been completed, the stirring and cooling with ice are continued for a further hour. The reaction mixture is then poured into 600 cc. of 1 N hydrochloric acid which contains small pieces of ice. The unreacted iodine deposited is dissolved by adding an aqueous solution of sodium thiosulfate until the brown color is eliminated. The remaining crystals are removed by filtration and washed with water to yield 33 grams of iodopropargyl p-carboxybenzyl ether. Recrystallisation from aqueous ethanol gives colorless, needle-like crystals of a melting point of 145–146° C.

Example 10

3 grams of propargyl triphenylmethyl ether are dissolved in 30 cc. of tetrahydrofuran and the solution is added with a mixture of 5 grams of potassium hydroxide, 5 cc. of water and 50 cc. of methanol. 3.45 grams of iodine are added gradually to the resulting admixture at room temperature under stirring. After the addition of iodine has been completed, the mixture is further stirred for an hour and then added with 100 cc. of water and subsequently continues to be stirred for a further hour. The crystals deposited are filtered. Recrystallisation from ethanol gives 2 grams of iodopropargyl triphenylmethyl ether as needle-like crystals of a melting point of 117–118° C.

Example 11

A solution of 3 grams of propargyl p-nitrobenzyl ether in 10 cc. of tetrahydrofuran is added with a mixture of 6 grams of potassium hydroxide, 5 cc. of water and 100 cc. of methanol. 5.1 grams of iodine are added gradually to the resultant admixture at 20° C. under stirring. After the addition of iodine has been completed, the mixture is stirred for a further hour and then added with 130 cc. of water. It is allowed to stand for 2 hours at 0° C., and the crystals deposited are filtered and washed with water. Recrystallisation from cyclohexane gives 3 grams of iodopropargyl p-nitrobenzyl ether as lightly yellow colored needle-like crystals, M.P. 86–87° C.

Example 12

50 grams of propargyl benzyl ether are dissolved in 300 cc. of methanol and the solution is added with a mixture of 57.5 grams of potassium hydroxide and 60 cc. of water. 100 grams of iodine are added gradually to the resulting mixture at room temperature under stirring. After the addition of iodine has been completed, the mixture is further stirred for an hour and then added with 100 cc. of water. The subsequent treatment in a similar way to Example 1 gives about 55 grams of iodopropargyl benzyl ether of a boiling point 119–120° C./0.02 mm. Hg.

Example 13

8.8 grams of propargyl m-cyanobenzyl ether of a boiling point 75–77° C./0.02 mm. Hg are added to a mixture of 8.5 grams of potassium hydroxide, 8.5 cc. of water and 50 cc. of methanol.

13 grams of iodine are added to the resulting admixture in small portions under stirring while being cooled by ice and water. After the addition of iodine, the mixture is further stirred for 30 minutes under ice-cooling.

The subsequent treatment in a similar way to Example 1 gives about 2 grams of iodopropargyl m-cyanobenzyl ether of a boiling point 142–143° C./0.018 mm. Hg.

What we claim is:

1. Iodopropargyl aralkyl ethers represented by the general formula

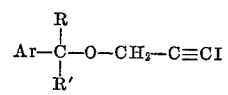

wherein Ar stands for a phenyl group which includes on the phenyl nucleus a substituent selected from the group consisting of hydrogen, halogen, cyano, nitro, carboxyl, lower alkyl and lower alkoxy; R is selected from the group consisting of hydrogen, lower alkyl radical and phenyl radical, and R′ is selected from the group consisting of hydrogen and phenyl radical provided that when R is a phenyl radical, R′ is hydrogen.

2. Iodopropargyl chlorobenzyl ethers.
3. Iodopropargyl p-methoxybenzyl ether.
4. Iodopropargyl benzhydryl ether.
5. Iodopropargyl methylbenzyl ethers.
6. Iodopropargyl p-nitrobenzyl ether.
7. Iodopropargyl benzyl ether.

No references cited.

CHARLES B. PARKER, *Primary Examiner.*

JOSEPH P. BRUST, *Examiner.*

D. H. TORRENCE, *Assistant Examiner.*